United States Patent
Lee

(10) Patent No.: US 7,724,983 B2
(45) Date of Patent: May 25, 2010

(54) ADAPTIVE IMAGE SIZE CONVERSION APPARATUS AND METHOD THEREOF

(75) Inventor: Young-ho Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 987 days.

(21) Appl. No.: 11/483,623

(22) Filed: Jul. 11, 2006

(65) Prior Publication Data

US 2007/0147708 A1   Jun. 28, 2007

(30) Foreign Application Priority Data

Dec. 26, 2005   (KR) ................... 10-2005-0129600

(51) Int. Cl.
   *G06K 9/32* (2006.01)
(52) U.S. Cl. .................................... 382/298
(58) Field of Classification Search ......... 345/147–151; 348/581, 747, E5.055; 382/298–301
   See application file for complete search history.

(56) References Cited

U.S. PATENT DOCUMENTS

| 6,088,061 A * | 7/2000 | Katata et al. ............. 348/390.1 |
| 2005/0025387 A1 * | 2/2005 | Luo ............................ 382/298 |
| 2005/0104897 A1 * | 5/2005 | Walker et al. ............... 345/620 |
| 2005/0168596 A1 * | 8/2005 | Ito et al. .................. 348/222.1 |
| 2005/0253964 A1 * | 11/2005 | Janssen et al. .............. 348/459 |
| 2005/0278749 A1 * | 12/2005 | Ewert et al. .................... 725/62 |
| 2007/0097261 A1 * | 5/2007 | Smith et al. ................. 348/445 |

FOREIGN PATENT DOCUMENTS

| JP | 06-245093 A | 9/1994 |
| JP | 07-131734 A | 5/1995 |
| JP | 2007096774 A * | 4/2007 |
| KR | 1999-026719 A | 4/1999 |
| KR | 10-2001-0074324 A | 8/2001 |

OTHER PUBLICATIONS

Microsoft, 2000, Microsoft, [online], [retrieved on Dec. 11, 2009], Retrieved from the Internet:<URL:http://www.microsoft.com/windows/windows2000/en/advanced/help/about_magnify.htm>.*

* cited by examiner

*Primary Examiner*—Matthew C Bella
*Assistant Examiner*—Gregory F Cunningham
(74) *Attorney, Agent, or Firm*—Sughrue Mion, PLLC

(57) ABSTRACT

An image size conversion apparatus and an image size conversion method are provided. The image size conversion apparatus includes an area detector which detects an interested area having a certain image distinguished over a general image from an input image, a scale ratio adjustor which adjusts a scale ratio for the interested area detected by the area detector, and a scaler to perform scaling for the input image according to the adjusted scale ratio. Accordingly, the scale ratio can be adjusted according to features of the input image so that an image without distortion can be displayed on a screen.

20 Claims, 7 Drawing Sheets

ADAPTIVE IMAGE SIZE CONVERSION APPARATUS AND METHOD THEREOF

CROSS-REFERENCE TO RELATED APPLICATIONS

This application claims benefit under 35 U.S.C. §119 (a) of Korean Patent Application No. 10-2005-0129600 filed on Dec. 26, 2005, the entire content of which is incorporated herein by reference.

BACKGROUND OF THE INVENTION

1. Field of the Invention

Apparatuses and methods consistent with the present invention relate to adaptive image size conversion, and more particularly, to adaptive image size conversion which adjusts an image size conversion rate according to features of image data to display the converted image on a screen.

2. Description of the Related Art

Generally, an image display device such as a television includes an image size conversion function such as 4:3 mode, 16:9 mode, panorama mode, enlargement 1 mode and enlargement 2 mode, and a user can adjust necessary modes to display the converted images on a screen.

FIG. 1 is a view illustrating a configuration of a conventional image size conversion apparatus.

Referring to FIG. 1, the conventional image size conversion apparatus includes a location detector 10, a scale ratio adjustor 12 and a scaler 14.

The location detector 10 detects information on a location of the present pixel in an input frame or field ($F_n$). The scale ratio adjustor 12 adjusts the scale ratio referring to the location information detected by the location detector 10. In detail, the scale ratio adjustor 12 adjusts the scale ratio to convert a size of the present pixel according to set modes. The scaler 14 changes the size of the frame or field ($F_n$) that is input according to the adjusted scale ratio.

FIG. 2 is a view illustrating an example of setting the scale ratio of a conventional image size conversion apparatus, and FIGS. 3A and 3B illustrate examples of image size conversion results of a conventional image size conversion apparatus.

The scale ratio of FIG. 2 is exemplified as a panorama. The panorama refers to a screen in which a central area A containing main characters or main scenes is not enlarged but only side areas B and C are enlarged, to naturally show an image generated by 4:3 ratio on a 16:9 screen. If an image is enlarged to a panorama size, a face area 22 or a letter area 24 included in the enlarged image is displayed on a screen 20 as distorted as shown FIGS. 3A and 3B.

Recently, lots of additional information is displayed on an image display device such as a television, using graphics or letters as well as an image. The graphics and letters may have an influence on readability if the scale ratio is not constant as the panorama of FIG. 2 when the image size is changed.

In detail, in case of letters transmitted through a ticker that moves at a constant speed and direction, the enlargement ratios between letters displayed on the central area A and the side areas B and C are different so that a user has a difficulty in reading letters.

Additionally, since human eyes can sensitively recognize a skin tone such as a face, the distortion is more significantly displayed in comparison with a general image if the face is displayed not on the central area A but on the side areas B and C. In case of graphics, since a luminance or a color is significantly changed, the distortion is more greatly displayed in comparison with a general image.

SUMMARY OF THE INVENTION

The present invention provides an adaptive image size conversion apparatus that changes a scaling ratio according to features of input images to convert an image size so that a distortion of image can be prevented and a readability of letters can be increased when an image size is converted.

According to an aspect of the present invention, there is provided an image size conversion apparatus including an area detector which detects an interested area having a certain image distinguished over a general image, from an input image, a scale ratio adjustor which adjusts a scale ratio for the interested area detected by the area detector, and a scaler to perform scaling for the input image according to the adjusted scale ratio.

The scale ratio adjustor may apply a constant scale ratio to the interested area.

The area detector may include a motion estimator which outputs a motion vector that estimates a motion for the input image, a ticker area detector which detects a ticker area including an image that moves at a constant speed and direction as the interested area from the input image using the motion vector, and a motion information detector which determines whether the image moving at a constant speed and direction exists in the ticker area.

The scale ratio adjustor includes a buffer area to adjust the scale ratio per every one horizontal line in a buffer area covering a section between a general image area displaying a general image and the ticker area so that the general image area and the ticker area can be connected to each other.

The area detector includes a skin tone detector which configures a skin tone histogram distributed in a horizontal position and a vertical position, and a face area detector which detects a face area, having skin tones more than a predetermined threshold value, as the interested area.

The face area detector may detect an area satisfying an equation below as a face area:

$$N^{Hface} + N^{Vface} > TH$$

where, $N^{Hface}$ refers to a face area in a horizontal direction and is obtained by dividing the number of skin tone histograms in a horizontal direction by a horizontal width, $N^{Vface}$ refers to a face area in a vertical direction and is obtained by dividing the number of the skin tone histograms in a vertical direction by a vertical width, and TH refers to a threshold value.

The threshold may be obtained by an equation below:

$$TH = (\text{test area/whole area}) \times \text{the number of whole histograms} \times \text{ratio}$$

where, the test area refers to an area collecting dots detected as the skin tone, and the whole area refers to an area of an image corresponding to one frame or field, the number of whole histograms refers to the number of the skin tone histograms included in the one frame or field, and the ratio refers to a preset scale ratio.

The area detector may include an edge detector which detects a pixel having a greater change of at least one of a luminance value and a color value of the input image than a predetermined reference value as an edge, and a graphic area detector which detects a graphic area, connecting pixels detected as edges, as the interested area.

According to an aspect of the present invention, there is provided an image size conversion method including operations of detecting an interest area having a certain image distinguished over a general image from an input image, adjusting a scale ratio for the interested area, and performing scaling for the input image according to the adjusted scale ratio.

The operation of adjusting the scale ratio may apply a constant scale ratio to the interested area.

The operation of detecting the interested area includes operations of outputting a motion vector that estimates a motion for the input image, detecting a ticker area, including an image that moves at a constant speed and direction, as the interested area from the input image using the motion vector, and determining whether the image moving at the constant speed and direction exists in the ticker area.

The operation of adjusting the scale ratio may adjust the scale ratio per every one horizontal line a buffer area covering a section between a general image area displaying a general image and the ticker area so that the general image area and the ticker area can be connected to each other.

The operation of detecting the interested area may include operations of configuring a skin tone histogram distributed in a horizontal position and a vertical position, and detecting a face area, having skin tones more than a predetermined threshold value, as the interested area.

In the operation of detecting the face area, having skin tones more than a predetermined threshold value, as the interested area using the skin tone histogram, an area satisfying an equation below as the face area:

$$N^{Hface} + N^{Vface} > TH$$

where, $N^{Hface}$ refers to a face area in a horizontal direction and is obtained by dividing the number of skin tone histograms in a horizontal direction by a horizontal width, $N^{Vface}$ refers to a face area in a vertical direction and is obtained by dividing the number of the skin tone histograms in a vertical direction by a vertical width, and TH refers to a threshold value.

The threshold may be obtained by an equation below:

$$TH = (\text{test area/whole area}) \times \text{the number of whole histograms} \times \text{ratio}$$

where, the test area refers to an area collecting dots detected as the skin tone, and the whole area refers to an area of an image corresponding to one frame or field, the number of whole histograms refers to the number of the skin tone histograms included in the one frame or field, and the ratio refers to a preset scale ratio.

The operation of detecting the interested area includes operations of detecting a pixel having a greater change of at least one of a luminance value and a color value of the input image than a predetermined reference value as an edge, and detecting a graphic area, connecting pixels detected as edges as the interested area.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
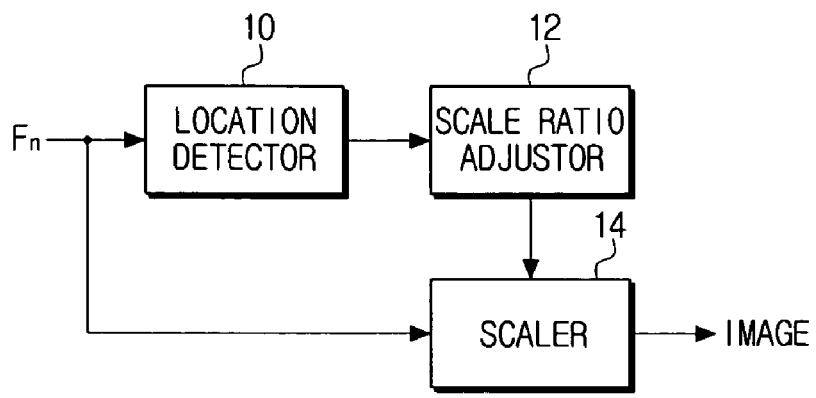
FIG. 1 is a view illustrating a configuration of a conventional image size conversion apparatus.
Figure 2:
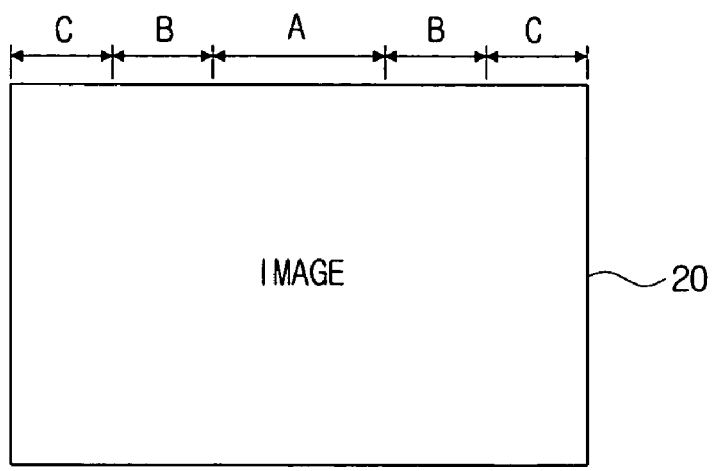
FIG. 2 is a view illustrating an example of setting a scale ratio of a conventional image size conversion apparatus.
Figure 3A:
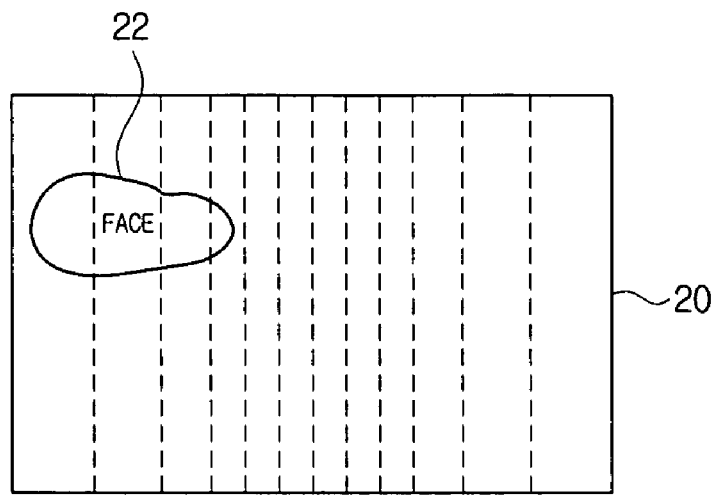
FIGS. 3A and 3B are views illustrating examples of image size conversion results of a conventional image size conversion apparatus.
Figure 3B:
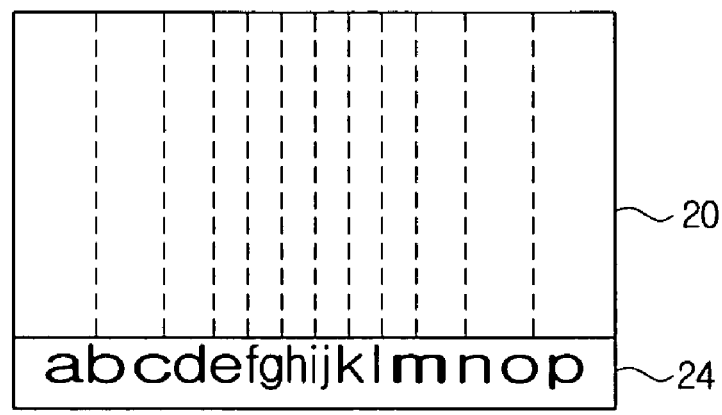

Exemplary embodiments of the present invention will be described in detail with reference to the annexed drawings. In the drawings, the same elements are denoted by the same reference numerals throughout the drawings. In the following description, detailed descriptions of known functions and configurations incorporated herein have been omitted for conciseness and clarity.

Figure 4:
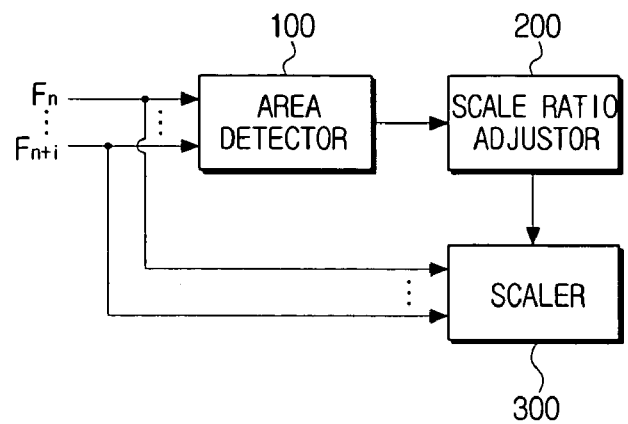
FIG. 4 is a view illustrating a schematic configuration of an image size conversion apparatus according to an exemplary embodiment of the present invention.

FIG. 4 is a view illustrating a schematic configuration of an image size conversion apparatus according to an exemplary embodiment of the present invention.

Referring to FIG. 4, the image size conversion apparatus comprises an area detector 100, a scale ratio adjustor 200 and a scaler 300.

The area detector 100 detects a ticker area, a face area and a graphic area from a field or frame ($F_n$, $F_{n+1}$, ... $F_{n+i}$; i=integer) of an input image. In detail, the area detector 100 detects an area in which an image moving at a constant speed and direction exists in the input image, as a ticker area, and detects a face area depending on a distribution of skin tones. Further, the area detector 100 senses a significant change of luminance value or color value to detect a graphic area.

The scale ratio adjustor 200 adjusts the scale ratio for areas detected by the area detector 100. In other words, the scale ratio adjustor 200 applies a constant scale ratio for the ticker area, the face area and the graphic area so as not to distort an image.

The scaler 300 performs various linear or non-linear interpolations such as bilinear, bi-cubic, cubic spline or sinc interpolation according to the scale ratio adjusted by the scale ratio adjustor 200 to output a final image.

Figure 5:
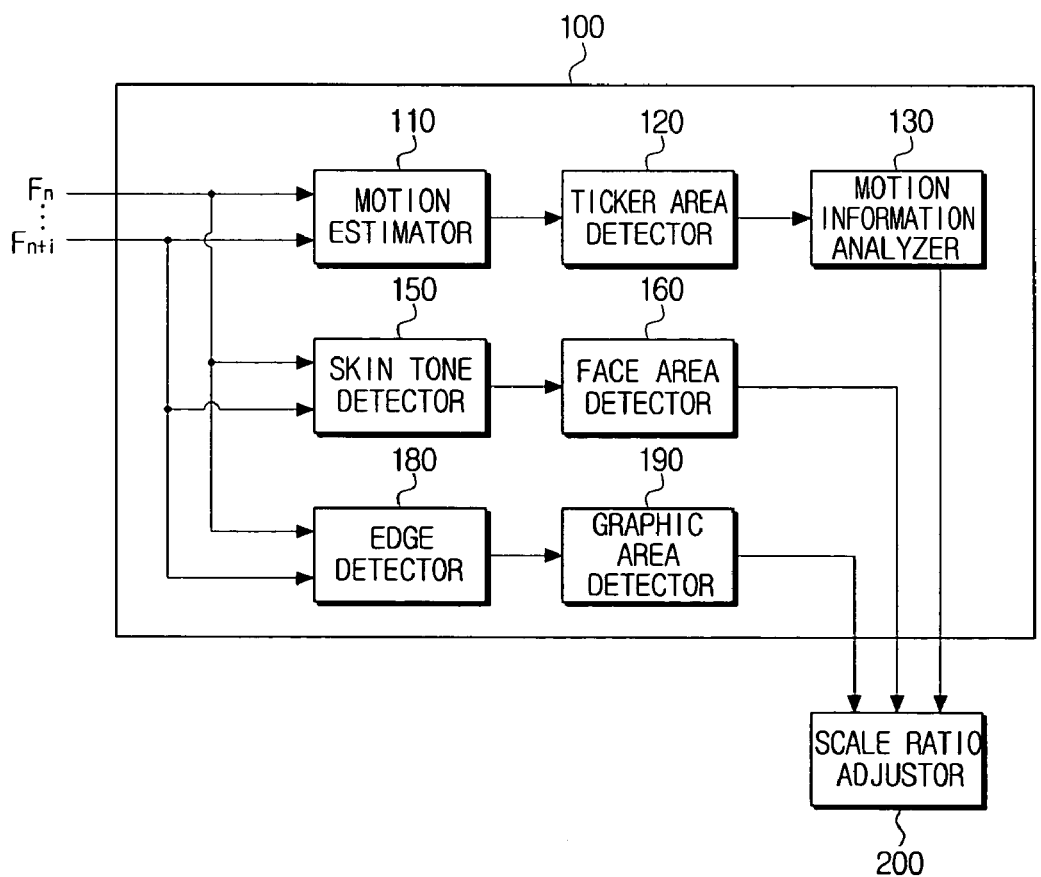
FIG. 5 is a view illustrating an area detector of an image size conversion apparatus according to an exemplary embodiment of the present invention.

FIG. 5 is a view illustrating a configuration of an area detector of an image size conversion apparatus according to an exemplary embodiment of the present invention.

Referring to FIG. 5, the area detector 100 of the image size conversion apparatus comprises a motion estimator 110, a ticker area detector 120, a motion information analyzer 130, a skin tone detector 150, a face area detector 160, an edge detector 180 and a graphic area detector 190.

The motion estimator 110 estimates a motion vector that shows a direction and a size of the motion of the input image using the feature of a field or a frame ($F_n$, $F_{n+1}$, ... $F_{n+i}$; i=integer) of the input image. The motion estimator 110 estimates the motion using various motion estimation algorithms such as a block matching algorithm (BMA) and phase correlation.

The ticker area detector 120 detects the ticker area of the input image using the motion vector estimated by the motion estimator 110. In other words, if the motion vector constantly appears in a certain area, the area is detected as the ticker area.

The motion information analyzer 130 determines if the ticker area detected by the ticker area detector 120 is genuine. In detail, the motion information analyzer 130 determines based on a frequency of the motion vector if an image moving at a constant speed and direction exists in the ticker area. If so, the area is determined to be a ticker area and if not, the area is determined not to be a ticker area.

The skin tone detector 150 configures a histogram for the skin tone distributed in horizontal and vertical positions of the field or the frame ($F_n$, $F_{n+1}$, ... $F_{n+i}$; i=integer) of the input image.

The face area detector 160 detects the face area using the histogram of the skin tone configured by the skin tone detector 150. In other words, the area satisfying the below equation 1 is detected as a face area.

$$N^{Hface} + N^{Vface} > TH \quad \text{[Equation 1]}$$

where, $N^{Hface}$ refers to a face area in a horizontal direction and is obtained by dividing the number of the skin tone histograms in a horizontal direction by a horizontal width. $N^{Vface}$ refers to a face area in a vertical direction and is obtained by dividing the number of the skin tone histograms in a vertical direction by a vertical width. TH refers to a threshold value and is preset or obtained using the below equation 2.

$$TH = (\text{test area/whole area}) \times \text{the number of whole histograms} \times \text{ratio} \quad \text{[Equation 2]}$$

where, the test area refers to an area collecting dots detected as the skin tone, and the whole area refers to an area of an image corresponding to one frame or field. The number of whole histograms refers to the number of the skin tone histograms included in one frame or field, and the ratio refers to a preset scale ratio.

The edge detector 180 detects an edge in which luminance value or color value of the input image is significantly changed. In other words, a pixel having changes of the luminance value or color value of the input image equal to or more than the preset reference value, is detected as an edge. The edge does not easily appear in general images but in graphics.

The graphic area detector 190 detects the graphic area using the edge detected by the edge detector 180. In other words, the area connecting pixels detected as the edge, is detected as the graphic area.

Figure 6A:
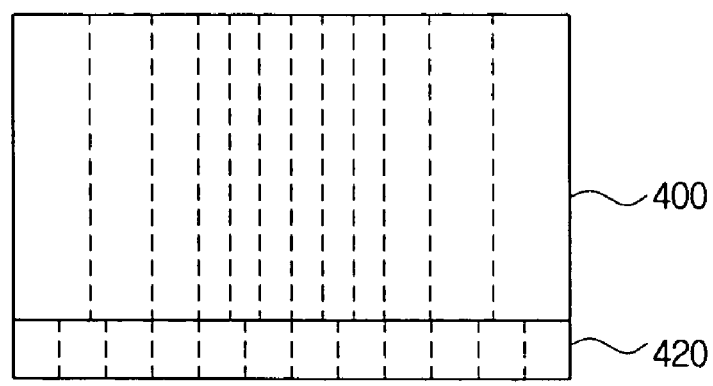
FIGS. 6A and 6B are views for explaining a method of converting a ticker area of an image size conversion apparatus according to an exemplary embodiment of the present invention.
Figure 6B:
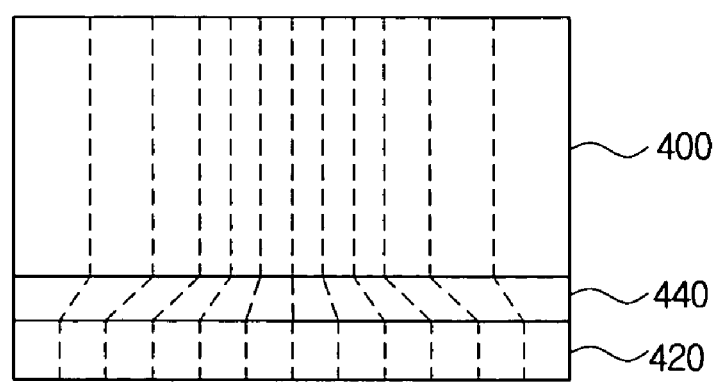

FIGS. 6A and 6B are views for explaining a conversion method of a ticker area of an image size conversion apparatus according to an exemplary embodiment of the present invention.

As shown in FIG. 6A, if the scaling ratio of a ticker area 420, in which an image moving at a constant speed and direction exists, is adjusted to differ from the scaling ratio of a general image area 400 displaying a general image, a line appears due to the scale ratio difference. To prevent this, a buffer area 440 is formed between the general image area 400 and the ticker area 420 as shown in FIG. 6B. The scale ratio adjuster 200 adjusts the scale ratio per every one horizontal line in the buffer area 440 covering a section between the general image area 400 and the ticker area 420 so that the general image area 400 can be smoothly connected to the ticker area 420.

Figure 7A:
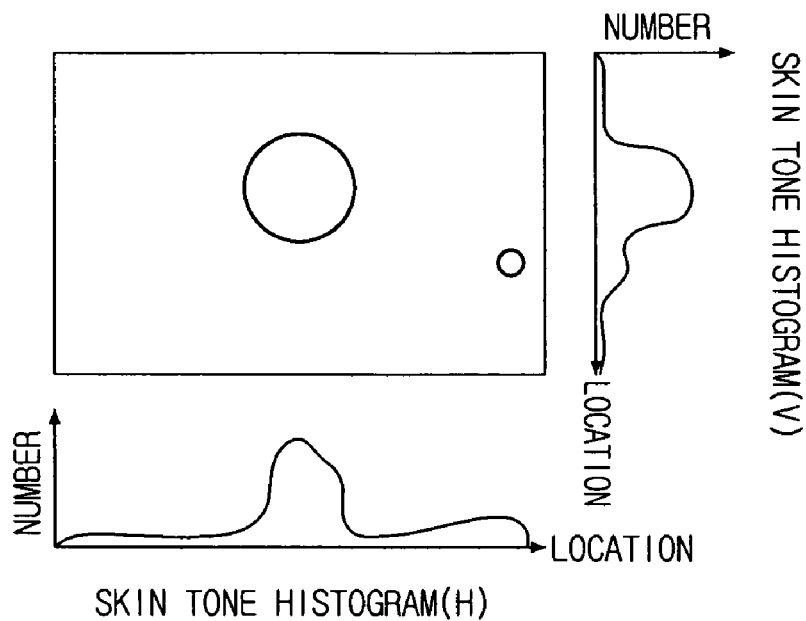
FIGS. 7A, 7B and 7C are views for explaining a method of converting a face area of an image size conversion apparatus according to an exemplary embodiment of the present invention.
Figure 7B:
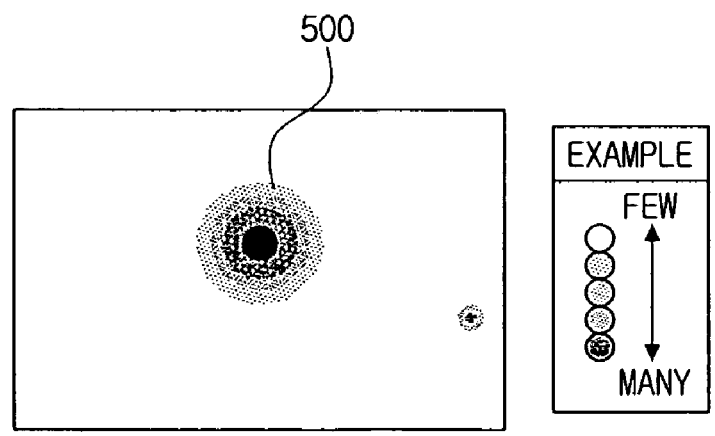
Figure 7C:
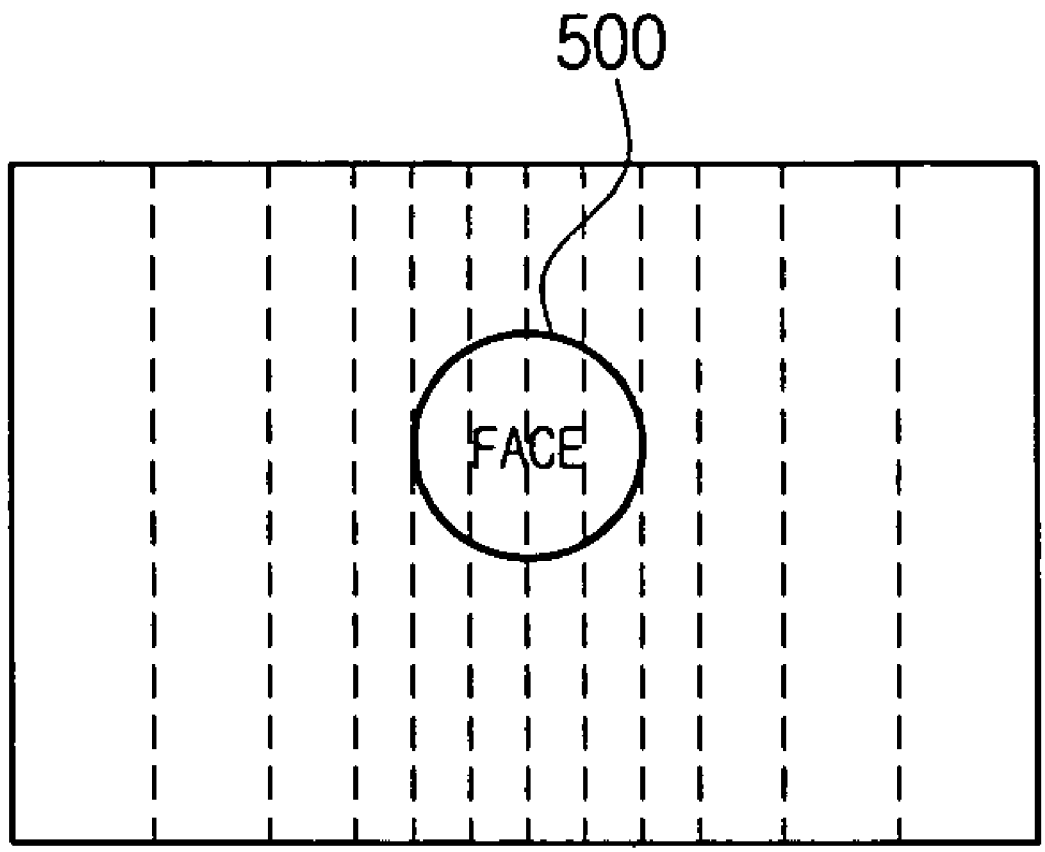

FIGS. 7A, 7B and 7C are views for explaining a face area conversion method of an image size conversion apparatus according to an exemplary embodiment of the present invention.

Referring to FIG. 7A, the skin tone distribution in horizontal and vertical directions is detected and histograms are configured to detect a face area 500. In other words, the skin tone histogram may be expressed as the number of skin tone histograms according to positions as shown in FIG. 7A. Using the skin tone histogram, the skin tone distribution can be expressed as an area consisting of dots as shown in FIG. 7B, and the face area 500 is detected by Equations 1 and 2.

The scale ratio for the detected face area 500 is adjusted so that a face image without a distortion can be displayed on a screen as shown in. FIG. 7C.

Figure 8:
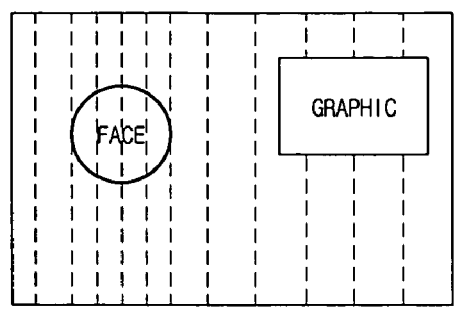
FIG. 8 is a graph illustrating conversion results of a face area and a graphic area of an image size conversion apparatus according to an exemplary embodiment of the present invention.

FIG. 8 is a view illustrating the conversion result of a face area and a graphic area of an image size conversion apparatus according to an exemplary embodiment of the present invention.

As shown in FIG. 8, the face area 500 and the graphic area 550 of the input area are detected and the scale ratio for each area is adjusted so that an image without a distortion can be generated when an image size is converted.

Figure 9:
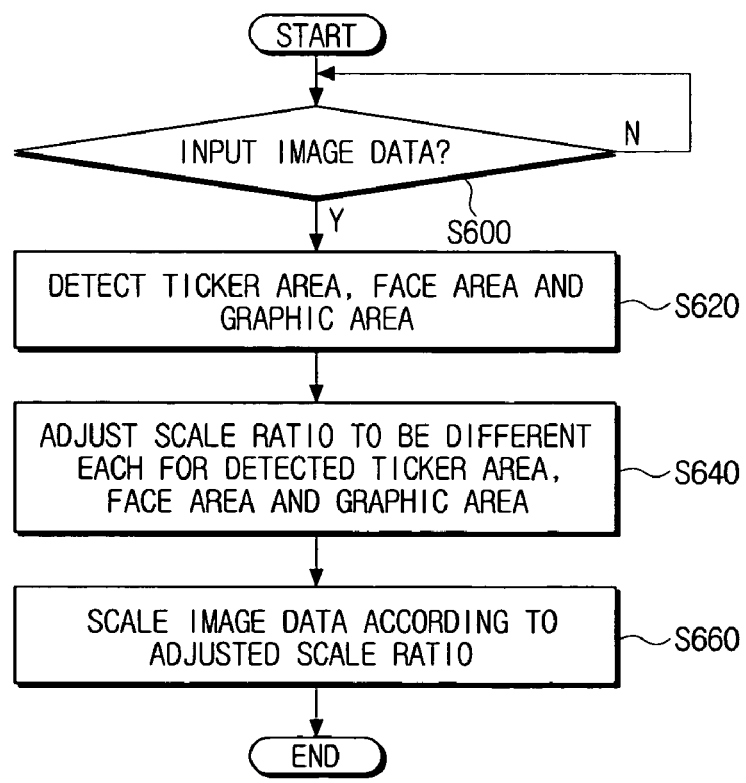
FIG. 9 is a flowchart for explaining an image size conversion method of an image size conversion apparatus according to an exemplary embodiment of the present invention.

FIG. 9 is a flowchart for explaining an image size conversion method of an image size conversion apparatus according to an exemplary embodiment of the present invention.

Referring to FIG. 9, as image data is input (S600), an interested area is detected. In other words, a ticker area, a face area and a graphic area are detected from the input image. At this time, the ticker area is detected using information on whether the image moves at a constant speed and direction, and the face area is detected using the skin tone histogram. The graphic area is detected using the edge in which the luminance value or the color value is significantly changed (S620).

The scaling ratios for the detected ticker area, face area and graphic area are adjusted. In detail, the scaling ratio, which is changed according to positions of pixels, is adjusted to be constant for the detected areas (S640).

The image data is scaled according to the adjusted scale ratio. In other words, various linear or non-linear interpolations such as bilinear, bi-cubic, cubic spline and sinc interpolation are performed according to the adjusted scale ratio to output a final image (S660).

By the above process, the scale ratio can be adaptively changed according to the feature of the input image.

As described above, according to the exemplary embodiments of the present invention, the scaling ratios can be changed according to the features of the input images to convert the image size so that the image distortion can be prevented and the readability of letters can be increased when an image size is converted which has different scaling ratios according to the pixel positions.

While the invention has been shown and described with reference to certain embodiments thereof, it will be understood by those skilled in the art that various changes in form and details may be made therein without departing from the spirit and scope of the invention as defined by the appended claims.

What is claimed is:

1. An image size conversion apparatus comprising:
   an area detector which detects an interested area comprising a certain image distinguished from a general image, from an input image to be displayed on a screen comprising the interested area, and a remaining area comprising the general image;

a scale ratio adjustor which adjusts a scale ratio for the input image so that a first scale ratio is applied to the interested area, and a second scale ratio, which is different from the first ratio, is applied to the remaining area; and a scaler which performs scaling for the input image according to the first and second scale ratios, wherein the first scale ratio is constant within the interested area regardless of a location of the interested area on the screen, and the second scale ratio changes within the remaining area.

2. The apparatus as claimed in claim 1, wherein the area detector comprises:

a motion estimator which outputs a motion vector that estimates a motion for the input image;

a ticker area detector which detects a ticker area, comprising a ticker image moving at a constant speed and direction using the motion vector; and a motion information analyzer which determines whether the ticker image exists in the ticker area, wherein the scale ratio adjustor applies to the ticker area a third scale ratio which is different from the first scale ratio and constant within the ticker area.

3. The apparatus as claimed in claim 2, wherein the scale ratio adjustor changes the scale ratio per every one horizontal line in a buffer area between the remaining area and the ticker area so that a change of the scale ratio between the first and second scale ratios appear to be substantially gradual.

4. The apparatus as claimed in claim 1, wherein the area detector comprises:

a skin tone detector which configures a skin tone histogram distributed in a horizontal position and a vertical position of the input image; and a face area detector which detects a face area having skin tones more than a threshold value, as the interested area using the skin tone histogram.

5. The apparatus as claimed in claim 4, wherein the face area detector detects as the face area an area satisfying an equation:

$$N^{Hface}+N^{Vface}>TH,$$

where $N^{Hface}$ is a face area in a horizontal direction obtained by dividing a number of skin tone histograms in a horizontal direction by a horizontal width, $N^{Vface}$ is a face area in a vertical direction obtained by dividing a number of the skin tone histograms in a vertical direction by a vertical width, and TH is the threshold value.

6. The apparatus as claimed in claim 5, wherein the threshold is obtained by an equation:

$$TH=(\text{test area/whole area})\times \text{a number of whole histograms}\times \text{ratio},$$

where the test area is an area collecting dots detected as the skin tone, the whole area is an area of an image corresponding to one frame or field, the number of whole histograms is a number of the skin tone histograms included in the one frame or field, and the ratio is a preset scale ratio.

7. The apparatus as claimed in claim 1, wherein the area detector comprises:

an edge detector which detects a pixel, having a greater change of at least one of a luminance value and a color value of the input image than a predetermined reference value, as an edge; and a graphic area detector which detects a graphic area, connecting pixels comprising the pixel, as the interested area.

8. The apparatus as claimed in claim 1, wherein the interested area comprises at least one of a ticker area comprising an image that moves at a constant speed and direction, a face area comprising skin tones more than a predetermined threshold value, and a graphic area constituted by connecting pixels each of which has a greater change of at least one of a luminance value and a color value of the input image than a predetermined reference value, and wherein the first scale ratio comprises a first constant scale ratio for the ticker area, a second constant scale ratio for the face area and a third constant scale ratio for the graphic area.

9. The image size conversion apparatus as claimed in claim 1, wherein the scaler performs the scaling for the input image according to the first and second scale ratios so that a size of the certain image and a size of the general image are determined according to the first and second scale ratio, respectively.

10. The image size conversion apparatus as claimed in claim 1, wherein the certain image is at least one of a human face and a graph image.

11. An image size conversion method comprising:

detecting an interest area having a certain image distinguished from a general image, from an input image to be displayed on a screen comprising the interested area, and a remaining area comprising the general image;

adjusting a scale ratio for the input image so that a first scale ratio is applied to the interested area, and a second scale ratio is applied to the remaining area; and performing scaling for the input image according to the first and second scale ratios, wherein the first scale ratio is constant within the interested area regardless of a location of the interested area on the screen, and the second scale ratio changes within the remaining area.

12. The method as claimed in claim 11, wherein, the detecting of the interested area comprises:

outputting a motion vector that estimates a motion for the input image;

detecting a ticker area, comprising a ticker image moving at a constant speed and direction, using the motion vector; and determining whether the ticker image exists in the ticker area, wherein, in the performing the scaling for the input image, a third scale ratio, which is different from the first scale ratio and is constant, is applied to the ticker area.

13. The method as claimed in claim 12, wherein, in the adjusting of the scale ratio, the scale ratio is changed per every one horizontal line in a buffer area between the remaining area and the ticker area so that a change of the scale ratio between the first and second scale ratios appear to be substantially gradual.

14. The method as claimed in claim 11, wherein the detecting of the interested area comprises:

configuring a skin tone histogram distributed in a horizontal position and a vertical position of the input image; and detecting a face area, having skin tones more than a threshold value, as the interested area using the skin tone histogram.

15. The method as claimed in claim 14, wherein in the detecting the face area, an area satisfying an equation $N^{Hface}+N^{Vface}>TH$ is detected as the face area, where $N^{Hface}$ is a face area in a horizontal direction obtained by dividing a number of skin tone histograms in a horizontal direction by a horizontal width, $N^{Vface}$ is a face area in a vertical direction obtained by dividing a number of the skin tone histograms in a vertical direction by a vertical width, and TH is the threshold value.

16. The method as claimed in claim 15, wherein the threshold is obtained by an equation:

$TH$=(test area/whole area)×the number of whole histograms×ratio, where the test area is an area collecting dots detected as the skin tone, and the whole area is an area of an image corresponding to one frame or field, the number of whole histograms refers to the number of the skin tone histograms included in the one frame or field, and the ratio is a preset scale ratio.

17. The method as claimed in claim 11, wherein the detecting of the interested area comprises:
  detecting a pixel, having a greater change of at least one of a luminance value and a color value of the input image than a predetermined reference value, as an edge; and
  detecting a graphic area, connecting pixels comprising the pixel, as the interested area.

18. The method as claimed in claim 11,
  wherein the interested area comprises at least one of a ticker area comprising an image that moves at a constant speed and direction, a face area comprising skin tones more than a predetermined threshold value, and a graphic area constituted by connecting pixels each of which has a greater change of at least one of a luminance value and a color value of the input image than a predetermined reference value, and
  wherein the first scale ratio comprises a first constant scale ratio for the ticker area, a second constant scale ratio for the face area and a third constant scale ratio for the graphic area.

19. The method as claimed in claim 11, wherein the scaling is performed for the input image according to the first and second scale ratios so that a size of the certain image and a size of the general image are determined according to the first and second scale ratio, respectively.

20. The method as claimed in claim 11, wherein the certain image is at least one of a human face and a graph image.

\* \* \* \* \*